US011632355B2

(12) United States Patent
Rajagopalan

(10) Patent No.: US 11,632,355 B2
(45) Date of Patent: Apr. 18, 2023

(54) COMPLIANCE MANAGEMENT ACROSS MULTIPLE CLOUD ENVIRONMENTS

(71) Applicant: Hewlett Packard Enterprise Development LP, Houston, TX (US)

(72) Inventor: Sundaram M. Rajagopalan, Waltham, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 795 days.

(21) Appl. No.: 16/248,161

(22) Filed: Jan. 15, 2019

(65) Prior Publication Data

US 2020/0228499 A1 Jul. 16, 2020

(51) Int. Cl.
*H04L 9/40* (2022.01)
*G06F 21/62* (2013.01)
*G06F 9/54* (2006.01)

(52) U.S. Cl.
CPC ...... *H04L 63/0263* (2013.01); *G06F 21/6209* (2013.01); *H04L 63/102* (2013.01); *H04L 63/205* (2013.01); *G06F 9/547* (2013.01)

(58) Field of Classification Search
CPC . H04L 63/0263; H04L 63/205; H04L 63/102; G06F 21/6209; G06F 21/57; G06F 9/547
See application file for complete search history.

(56) References Cited

U.S. PATENT DOCUMENTS 8,238,256 B2 8/2012 Nugent
10,824,462 B2 * 11/2020 Pasupathy ................. G06F 8/60
2011/0246499 A1 10/2011 Carmel et al.
2012/0011077 A1 1/2012 Bhagat
2013/0332421 A1 12/2013 Bader et al.
2017/0104755 A1 * 4/2017 Arregoces ............. H04L 63/104
2018/0364996 A1 * 12/2018 Anandam ................. G06F 8/65
2020/0228415 A1 * 7/2020 Rajagopalan ....... H04L 41/0853
2021/0044498 A1 * 2/2021 Mercian ............. H04L 41/0843

OTHER PUBLICATIONS

Kostas Bariotis, "Making a REST API discoverable", https://kostasbariotis.com/making-a-rest-api-discoverable/, Aug. 24, 2015, 2 pages (Year: 2015).*
Alansari, M.M. et al., "CloudMPL: a Domain Specific Language for Describing Management Policies for an Autonomic Cloud Infrastructure," Jul. 31, 2018, http://www.cs.bham.ac.uk/~bib/Papers/2015.2.pdf.
Oracle, "Enterprise Manager Lifecycle Management Administrator's Guide," 2018, https://docs.oracle.com/cd/E24628_01/em.121/e27046/compliance_lcm.htm#EMLCM9379.
Check Point Software Technologies Ltd., "The Quest for Software Defined Cloud Governance—Introducing GSL", Feb. 2017, 12 pages, available at <https://blog.checkpoint.com/2017/02/12/software-defined-governance-gsl/>.

* cited by examiner

Primary Examiner — Han Yang
(74) Attorney, Agent, or Firm — Mauriel Kapouytian Woods LLP

(57) ABSTRACT

Systems and methods are provided for compliance management across multiple cloud environments. In some embodiments, the method includes receiving a rule, the rule using one or more statelets, wherein at least one of the statelets represents information procurable from a second cloud environment, wherein the second cloud environment is external to the first cloud environment; procuring the information from the second cloud environment; and executing the rule within the first cloud environment.

17 Claims, 5 Drawing Sheets

COMPLIANCE MANAGEMENT ACROSS MULTIPLE CLOUD ENVIRONMENTS

DESCRIPTION OF RELATED ART

The disclosed technology relates generally to computer networks, and more particularly to compliance management in computer networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
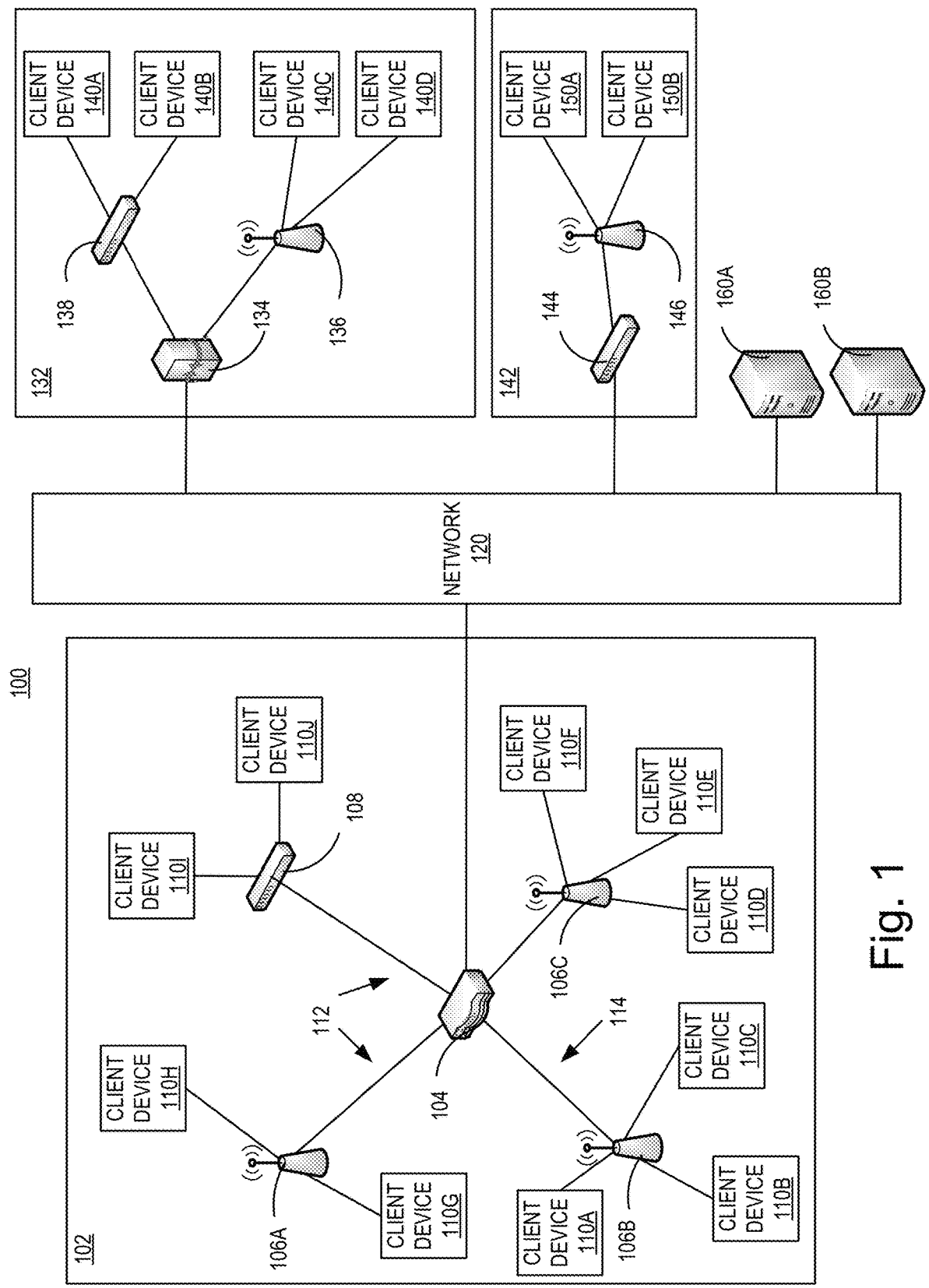
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

As companies transition computing to the cloud, new functionalities are demanded and consequently new complexities emerge. For example, audit of governance, regulation and compliance (GRC) becomes an increasingly difficult problem as cloud environments add the complexities of managing extremely quickly changing Information Technology (IT) environments, public-Internet facing infrastructure, and changing application developer needs such as virtualized compute, storage and network and new platform environments like containers. And during the transition, the emergence of hybrid IT has become an additional factor creating more complexity than the fairly recent on-premises and hardware-based IT environments. Previous methods of IT compliance, which relied heavily on human interactions and processes, are both error-prone and time consuming and in many cases, simply not possible in the cloud environment. There is thus a need to automate and streamline IT processes that are involved with keeping IT environments compliant but at the same time inexpensive and responsive to demand.

Furthermore, even IT environments not migrating to the cloud are being affected by cloud implementations. For example, many local data centers are being replaced by virtual data centers offered by cloud vendors. In these virtual data centers must meet the requirements of traditional data centers.

To evaluate compliance in cloud environments and hybrid IT environments, a rules engine may be implemented. These engines however, may be complex and inflexible. In particular, each rules engine is particular to a certain cloud environment provided by a certain vendor. Current approaches to cloud management make the software effort intensive and thereby both increases lead time to market and expenses related to development. As new technologies are being released at a rapid pace, application developers are looking to take advantage of a copiously available software marketplace in the cloud that enables them to deliver on new business applications equally quickly. A rules architecture is provided which enables rapid application development and rules authorship, with a minimal amount of software development overhead and increased reusability.

Embodiments of the disclosed technology provide a rules engine and a domain-specific language which allow for writing statements that evaluate the cloud environment using rules, and perform actions in the cloud environment, based on the evaluation. The rules engine and language described herein may evaluate and take action across multiple cloud environments. For example, a rules engine executing in a cloud environment may evaluate resources in another cloud environment, and may take action in that cloud environment. While described in terms of cloud environments, embodiments of the disclosed technology may be implemented in other computing environments as well.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120. Any of the sites 120, 132, and 142 may be implemented using cloud networking technology, and may include virtual data centers and the like.

The primary site 102 may include a primary network (not shown), which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102. These network communications may be wired or wireless, synchronous or asynchronous, and real-time or non-real-time.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (Aps) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate with the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a j, 140a-d, 150a-b may request and access the multimedia content provided by the content servers 160a-b.

Figure 2:
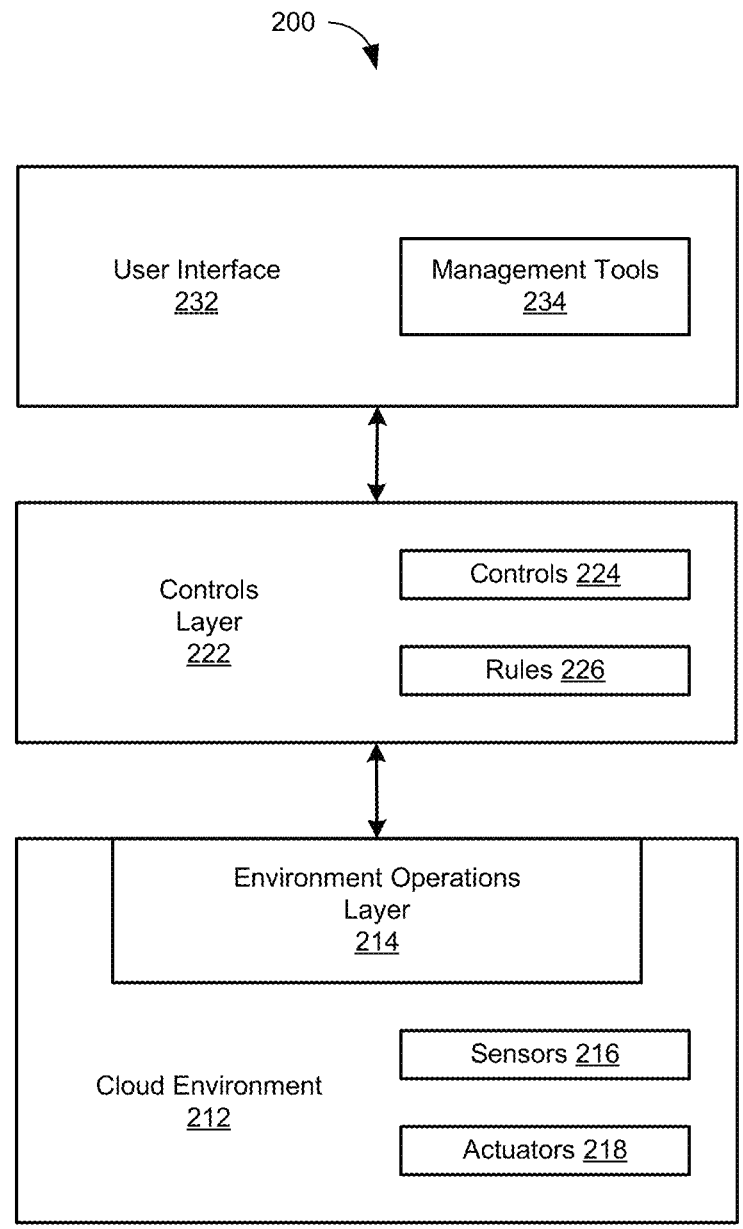
FIG. 2 illustrates a multi-layered compliance management architecture provided by embodiments of the disclosed technology.

FIG. 2 illustrates a multi-layered compliance management architecture according to some embodiments of the disclosed technology. Referring to FIG. 2, the architecture 200 includes a cloud environment 212. The cloud environment 212 may be a cloud environment, an on-premises environment, or a combination of the two, that is, a hybrid IT environment.

The cloud environment 212 includes one or more sensors 216. The sensors 216 may include virtual sensors, for example to sense the value of a parameter stored in a memory location. The sensors 216 may include physical sensors, for example to sense the status of for example to actuate security alarms, door locks, lights, and the like. The cloud environment 212 may include one or more actuators 218. The actuators 218 may include virtual actuators, for example to change the value of a parameter stored in a memory location. The actuators 218 may include physical actuators, for example to actuate security alarms, door locks, lights, and the like.

One or more environment operations layers 214 may be deployed within the cloud environment 212. Each environment operations layer 214 forms the bottom layer of the multilayered architecture, and communicates with the sensors 216 and the actuators 218. The environment operations layer 214 may include cloud management interfaces provided by a cloud provider. Examples of current cloud providers include Microsoft Azure and Amazon Web Services (AWS). The cloud environments may be implemented as public cloud environments, private cloud environments, or a combination of the two. The cloud environments may be implemented as public cloud environments, private cloud environments, or a combination of the two.

The architecture 200 includes one or more controls layers 222. Each controls layer 222 includes one or more controls 224. The controls layer 222 is in communication with the environment operations layer 214 in the cloud environment 212. Each control 224 in the controls layer controls one of the sensors 216, or one of the actuators 218, in the cloud environment 212, in accordance with one or more compliance rules 226. In some embodiments, the compliance rules 226 include governance, regulation and compliance (GRC) rules.

The architecture 200 may include one or more user interfaces 232. Each user interface 232 may include one or more management tools 234. The management tools 234 may be employed by the user to manage the controls 224 in a controls layer 222. The multilayer architecture 200 thereby allows the user to control components of cloud environment 212 using an interface that is independent of the manner of implementation of the cloud environment 212.

Figure 3:
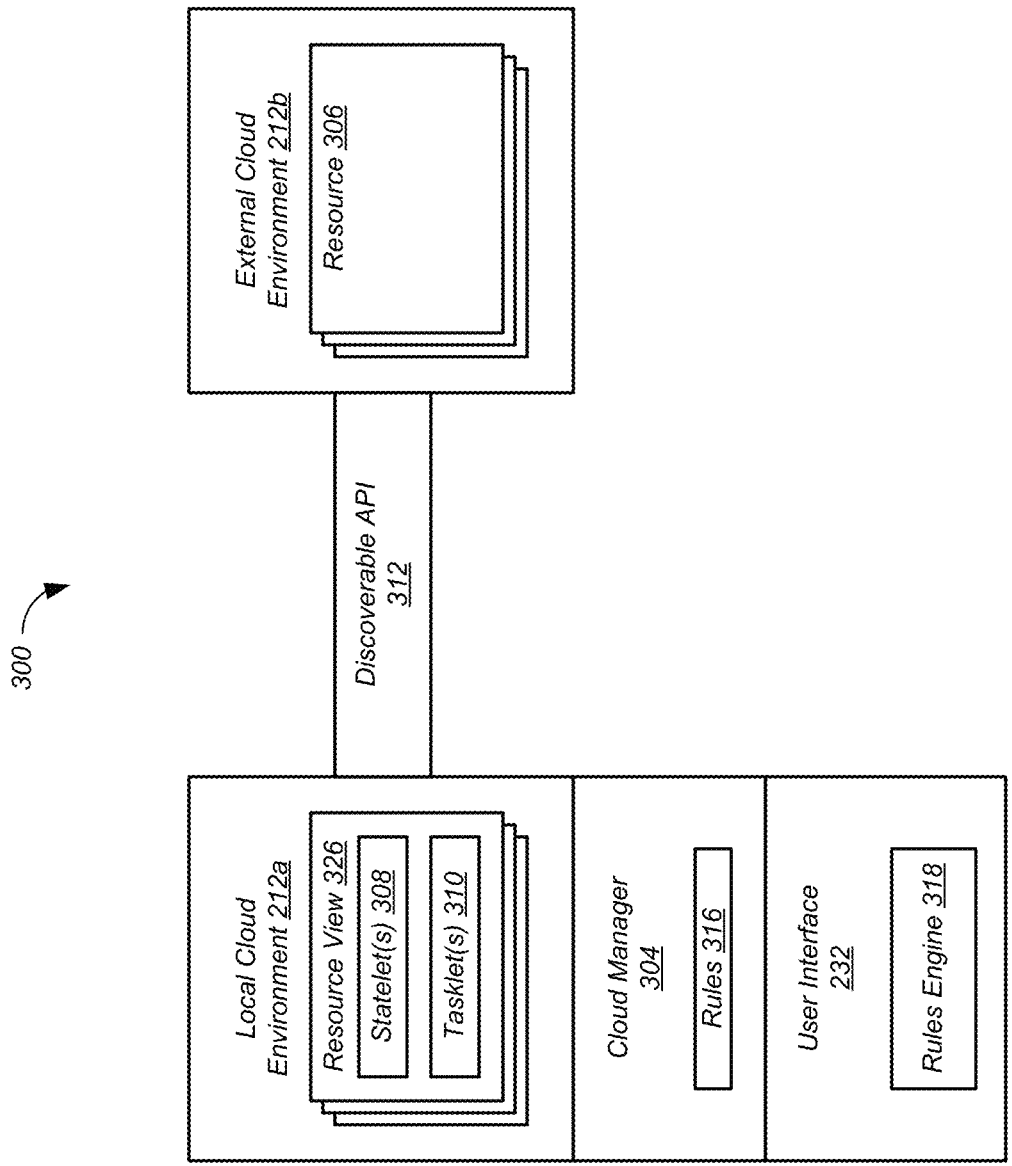
FIG. 3 depicts a management system for multiple cloud environments according to one embodiment of the disclosed technology.
Figure 4:
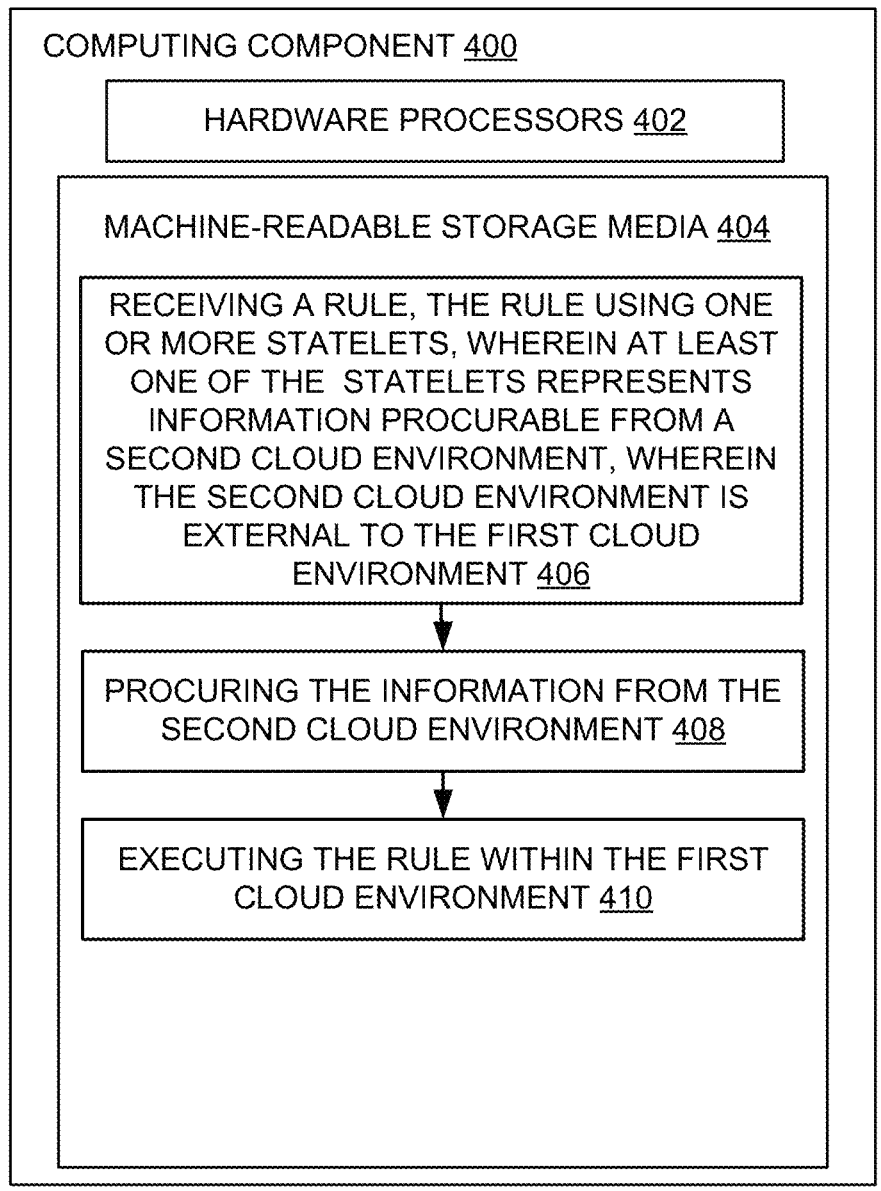
FIG. 4 is a block diagram of an example computing component or device for providing a multilayered cloud environment management system in accordance with one embodiment.
Figure 5:
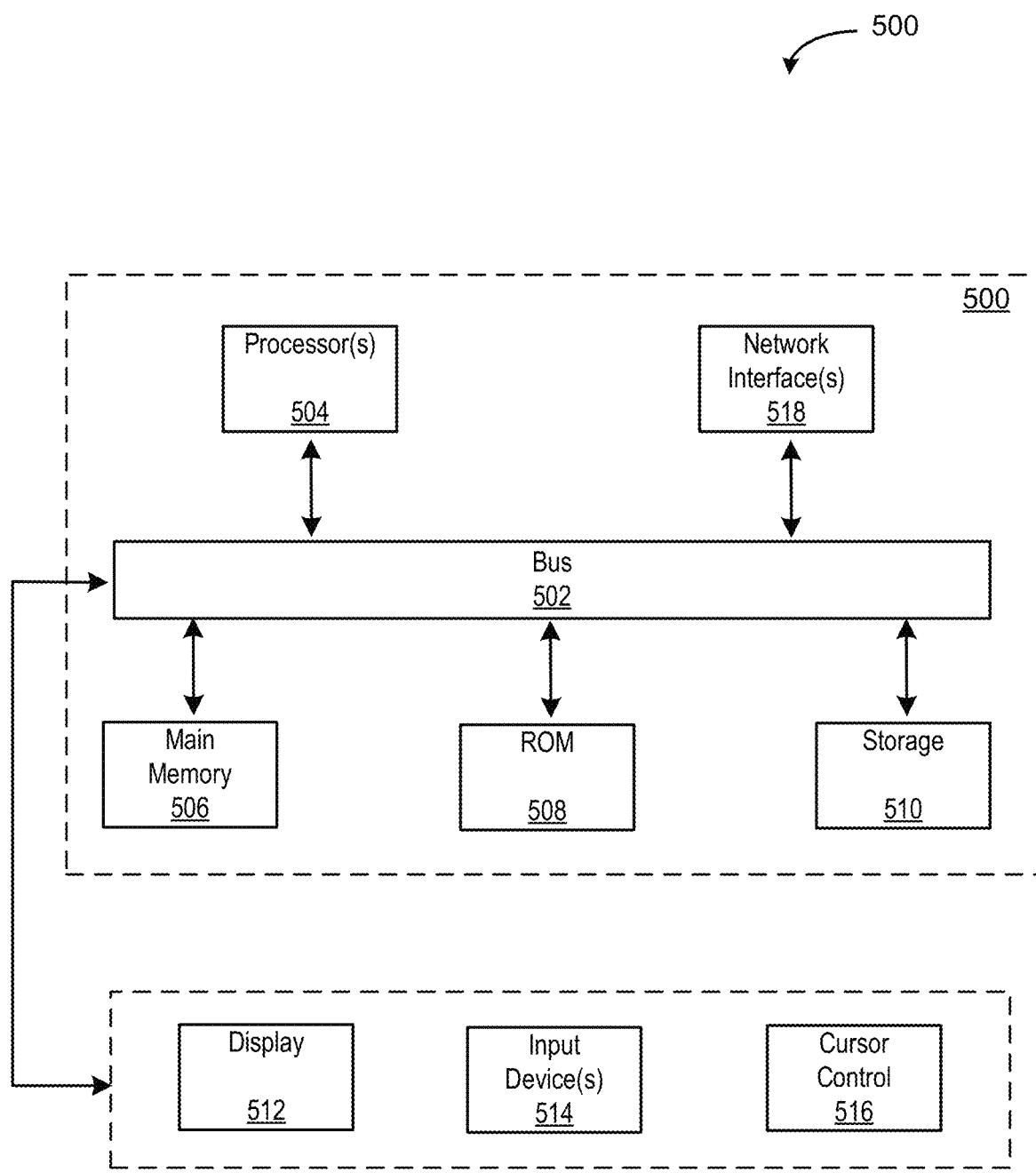
FIG. 5 depicts a block diagram of an example computer system in which various of the embodiments described herein may be implemented.

The multi-layered architecture 200 of FIG. 2 may be implemented in a variety of multi-layered cloud environment management configurations to support different requirements. FIGS. 3-5 depict three example configurations. However, other configurations are contemplated.

FIG. 3 depicts a management system for multiple cloud environments according to one embodiment of the disclosed technology. Referring to FIG. 3, the management system 300 includes two cloud environments: a local cloud environment 212*a*, and an external cloud environment 212*b*. While the cloud environment management system 300 of FIG. 3 manages two cloud environments 212*a,b*, other embodiments may manage any number of cloud environments 212. Each cloud environment 212 comprises one or more resources 306*a,b*. Each resource 306 provides one or more statelets 308*a,b* and one or more tasklets 310*a,b*. Each statelet 308 represents information that may be procured from a resource 306. Each tasklet 310 represents an action that may be performed with a resource 306. The statelets 308, and the tasklets 310, are described in more detail below.

The management system 300 includes a cloud manager 304. The cloud manager 304 may be implemented as a combination of the controls layer 222 and the environment operations layer 214 of the architecture 200 of FIG. 2. The cloud manager 304 manages the local cloud environment 212*a* according to one or more rules 316. The management system 300 includes a user interface 232. The user interface allows users to interact with the cloud manager 304 to manage, not only the local cloud environment 212*a*, but also other cloud environments, such as external cloud environment 212*b*, that provide discoverable application programming interfaces (API), such as discoverable API 312. A discoverable API is an API that software may traverse by knowing only the API's root endpoint. A discoverable API 312 may be implemented as a Representational State Transfer (REST) API, a message queue, or the like.

FIG. 4 is a block diagram of an example computing component or device 400 for providing a multilayered cloud environment management system in accordance with one embodiment. Computing component 400 may be, for example, a server computer, a controller, or any other similar computing component capable of processing data. In the example implementation of FIG. 4, the computing component 400 includes a hardware processor, 402, and machine-readable storage medium, 404.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-410, to control processes or operations according to various embodiments. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-410.

Hardware processor 402 may execute instruction 406 to receive a rule 316 in a first cloud environment 212*a*, the rule 316 using one or more statelets 308, wherein at least one of the statelets 308 represents information procurable from a second cloud environment 212*b*, wherein the second cloud environment 212*b* is external to the first cloud environment 212*a*. For example, referring to FIG. 3, the local cloud environment 212*a* provides a corresponding resource view 326 of each resource 306 in the external cloud environment 212*b*. Each resource view 326 may provide one or more statelets 308 representing information procurable from a resource 306 in the external cloud environment 212*b*. The rule 316 may be created by a user employing the rules engine 318 in the user interface 232, and may be stored in the cloud manager 304.

A statelet 308 is a representation of a small, well-defined portion of a cloud environment state. The statelet 308 may be procured from an external cloud environments 212*b* using a discoverable API 312. For example, HTTP GET endpoints may be collected into statelets 308.

These statelets 308 may be scalars, such as string, number or list values. In the described embodiments, the statelets 308 are made available easily via the addition of the discoverable API 312 into a configuration section of the rules engine 318. In some embodiments, the statelets 308 may represent any state stored in a cloud environment 212 that is either local, or accessible by a discoverable API 312. A statelet 308 that is accessible by a discoverable API 312 may include a normative specification of everything the API can provide. Statelets 308 may be distinguished by the context they belong to by using the dotted notation shown below. The combination of statelet technology and the dotted notation in the rules language allows for combining statelets 308 from various cloud environments 212. And as long as a Software Development Kit (SDK) is available for a new technology (e.g., a cloud speech API), the SDK can be added to the configuration of the rules engine 318 to make available the API 312 in the new technology using statelets 308 that can be included in the rules 316. Authentication and authorization credentials for the API 312 may be managed by the SDK.

Returning to FIG. 4, hardware processor 402 may execute instruction 408 to procure the information from the second cloud environment 212. In the example of FIG. 3, the information represented by the statelets 308b in the external cloud environment 212b may be procured. As an example, the disclosed technology may be used for evaluating a state in a cloud environment 212 implemented using Amazon Web Services (AWS). The AWS API is added into the rules engine 318 to permit procuring information about the state of the AWS environment. Then, speech functionality may be implemented using the rules 316. According to the disclosed technology, the SDK for a cloud speech API can be added to the rules engine 318. The rules engine 318 may parse the speech API state according to the rules language into specific API calls on the cloud speech API. After the cloud speech API is added to the rules engine 318, rules 316 may be written to call the API endpoints on the cloud speech API.

In much the same manner, actions may be performed in external cloud environments 212 using well-defined small tasks, referred to herein as tasklets 310. For example, PUT, POST, and DELETE endpoints may be converted into tasklets 310. The combination of statelets 308 and tasklets 310, along with the auto-discovery of statelets 308 and tasklets 310 through discoverable APIs 312 allow users to quickly write rules 316 that evaluate and manipulate external cloud environments 212 on an as-needed basis.

The rules 316 may also define one or more tasklets 310, wherein at least one of the tasklets 310 represents an action that may be taken in the second cloud environment 212b, wherein executing the rule 316 within the first cloud environment 212a comprises taking the action represented by the tasklet 310.

A statelet 308 may be defined as follows:
statelet==context.stateletName (parameters)
A tasklet 310 may be defined as follows:
tasklet==context.taskletName (parameters)
A rule 316 may be expressed as a function f of one or more statelets 308 and/or one or more tasklets 310, for example:
R=f(statelet_1, statelet_2, . . . , statelet_n, tasklet_1, tasklet_2, . . . , tasklet_n)

The disclosed rules language allows for statelets 308 and/or tasklets 310 to be compared and manipulated using arithmetic, binary and logical operators.

Hardware processor 402 may execute instruction 410 to perform executing the rule 316 within the first cloud environment. In the example of FIG. 3, a rule 316 may be executed within the local cloud environment 212a.

In some embodiments, a rule 316 may specify a condition associated with one of the statelets 308. In such embodiments, executing the rule 316 comprises taking the action specified by the one of the tasklets 310 when the condition is satisfied. In some embodiments, executing a rule 316 may include synchronously receiving the information represented by the statelet 308. In some embodiments, executing a rule 316 may include asynchronously receiving the information represented by the statelet 308.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system for implementing general-purpose rules in a first cloud environment, the system comprising:
   a hardware processor; and
   a non-transitory machine-readable storage medium encoded with instructions executable by the hardware processor to perform a method comprising:
      receiving a rule, the rule expressed as a function of one or more statelets and of one or more tasklets, wherein statelets represent a portion of a cloud environment state procurable from a second cloud environment, wherein the second cloud environment is external to the first cloud environment, and tasklets represent actions to be performed in the second cloud environment;
      procuring the portion of the cloud environment state from the second cloud environment corresponding to the one or more statelets; and
      executing the rule within the first cloud environment to cause the actions represented by the one or more tasklets to be performed in the second cloud environment; wherein:
      the hardware processor is configured to manage network devices in the first cloud environment and to manage network devices in the second cloud environment;
      the one or more statelets and the one or more tasklets are obtained by auto-discovery using one or more discoverable application programming interfaces (APIs);
      a statelet of the one or more statelets used to express the rule identifies a discoverable API of the second cloud environment; and
      procuring the information from the second cloud environment comprises procuring the information represented by the statelet according to the discoverable API.

2. The system of claim 1, the system further comprising creating the rule.

3. The system of claim 1, wherein the rule defines the one or more tasklets, wherein at least one of the tasklets represents an action that may be taken in the second cloud environment, and wherein executing the rule within the first cloud environment comprises taking the action represented by the tasklet.

4. The system of claim 3, wherein:
   the rule specifies a condition associated with one of the tasklets; and
   executing the rule comprises taking the action specified by the one of the tasklets when the condition is satisfied.

5. The system of claim 1, wherein executing the rule comprises at least one of synchronously receiving the information represented by the one or more statelets, and asynchronously receiving the information represented by the one or more statelets.

6. The system of claim 1, wherein the first cloud environment is at least one of a private cloud environment, and a public cloud environment.

7. A non-transitory machine-readable storage medium encoded with instructions executable by a hardware processor of a computing component for implementing general-purpose rules in a first cloud environment, the machine-readable storage medium comprising instructions to cause the hardware processor to perform a method comprising:
   receiving a rule, the rule expressed as a function of one or more statelets and of one or more tasklets, wherein statelets represent a portion of a cloud environment state procurable from a second cloud environment, wherein the second cloud environment is external to the first cloud environment, and tasklets represent actions to be performed in the second cloud environment;
   procuring the portion of the cloud environment state from the second cloud environment corresponding to the one or more statelets; and
   executing the rule within the first cloud environment to cause the actions represented by the one or more tasklets to be performed in the second cloud environment; wherein:
   the hardware processor is configured to manage network devices in the first cloud environment and to manage network devices in the second cloud environment;
   the one or more statelets and the one or more tasklets are obtained by auto-discovery using one or more discoverable application programming interfaces (APIs);
   a statelet of the one or more statelets used to express the rule identifies a discoverable API of the second cloud environment; and
   procuring the information from the second cloud environment comprises procuring the information represented by the statelet according to the discoverable API.

8. The non-transitory machine-readable storage medium of claim 7, the method further comprising creating the rule.

9. The non-transitory machine-readable storage medium of claim 7, wherein the rule defines the one or more tasklets, wherein at least one of the tasklets represents an action that may be taken in the second cloud environment, and wherein executing the rule within the first cloud environment comprises taking the action represented by the tasklet.

10. The non-transitory machine-readable storage medium of claim 9, wherein the rule specifies a condition associated with one of the tasklets, and wherein executing the rule comprises taking the action specified by the one of the tasklets when the condition is satisfied.

11. The non-transitory machine-readable storage medium of claim 7, wherein executing the rule comprises at least one of synchronously receiving the information represented by the one or more statelets, and asynchronously receiving the information represented by the one or more statelets.

12. The non-transitory machine-readable storage medium of claim 7, wherein the first cloud environment is at least one of a private cloud environment, and a public cloud environment.

13. A method for implementing general-purpose rules in a first cloud environment, using a hardware processor configured to execute instructions stored in a non-transitory computer readable medium, the method comprising:

receiving a rule, the rule expressed as a function of one or more statelets and of one or more tasklets, wherein statelets represent a portion of a cloud environment state procurable from a second cloud environment, wherein the second cloud environment is external to the first cloud environment, and tasklets represent actions to be performed in the second cloud environment;

procuring the portion of the cloud environment state from the second cloud environment corresponding to the one or more statelets; and executing the rule within the first cloud environment to cause the actions represented by the one or more tasklets to be performed in the second cloud environment; wherein:

the hardware processor is configured to manage network devices in the first cloud environment and to manage network devices in the second cloud environment;

the one or more statelets and the one or more tasklets are obtained by auto-discovery using one or more discoverable application programming interfaces (APIs);

a statelet of the one or more statelets used to express the rule identifies a discoverable API of the second cloud environment; and procuring the information from the second cloud environment comprises procuring the information represented by the statelet according to the discoverable API.

14. The method of claim 13, further comprising creating the rule.

15. The method of claim 13, wherein the rule defines the one or more tasklets, wherein at least one of the tasklets represents an action that may be taken in the second cloud environment, and wherein executing the rule within the first cloud environment comprises taking the action represented by the tasklet.

16. The method of claim 15, wherein the rule specifies a condition associated with one of the tasklets, and wherein executing the rule comprises taking the action specified by the one of the tasklets when the condition is satisfied.

17. The method of claim 13, wherein executing the rule comprises at least one of synchronously receiving the information represented by the one or more statelets, and asynchronously receiving the information represented by the one or more statelets.

* * * * *